United States Patent [19]
McGuire

[11] 3,769,848
[45] Nov. 6, 1973

[54] AUTOMATIC SHIFTING MEANS FOR MULTISPEED BICYCLES

[76] Inventor: Wayne McGuire, 4290 David St., Castro Valley, Calif. 94546

[22] Filed: June 26, 1972

[21] Appl. No.: 266,245

[52] U.S. Cl. .......................................... 74/217 B
[51] Int. Cl. ............................................ F16h 11/00
[58] Field of Search ......... 74/217 B, 337, 230.17 M

[56] References Cited
FOREIGN PATENTS OR APPLICATIONS

| 226,386 | 3/1943 | Switzerland | 74/217 B |
| 456,541 | 1950 | Italy | 74/217 B |
| 161,464 | 1933 | Switzerland | 74/217 B |
| 1,007,331 | 1949 | France | 74/217 B |
| 1,105,376 | 1949 | France | 74/217 B |

Primary Examiner—Charles J. Myhre
Assistant Examiner—R. H. Lazarus
Attorney—Gordon Wood

[57] ABSTRACT

Automatic shifting means for multispeed bicycles of the type having a plurality of chain sprockets mounted on a rear wheel hub. A torque sensing means is provided for automatically shifting the hub axially of a shaft on which it is supported in response to variations in torque. In the preferred form of the invention, a cam track is provided on a shaft on which the hub is peripherally and axially movable and a follower is carried by the hub so as to move the hub axially against the urgency of a spring as the torque on the hub increases. Said spring acts to move the hub axially in the opposite direction as the torque decreases. Also disclosed is means for locking the sprocket hub against movement to prevent automatic shifting and additional means is provided to permit manual shifting by a derailer if desired.

7 Claims, 10 Drawing Figures

PATENTED NOV 6 1973 3,769,848
SHEET 1 OF 4

PATENTED NOV 6 1973 3,769,848

AUTOMATIC SHIFTING MEANS FOR MULTISPEED BICYCLES

This invention relates to multispeed bicycles of the type provided with a plurality of chain sprockets of different size adjacent the rear wheel and wherein derailing means is provided for shifting the chain from one sprocket to another when desired.

In conventional multispeed bicycles of the type herein contemplated, the chain is moved from one sprocket to another by deflecting the chain laterally at a point ahead of the sprockets so that the deflected chain derails from one sprocket and meshes with an adjacent sprocket. Such deflection of the chain has heretofore been accomplished manually through a derailer actuated by means of a flexible wire operated by the rider. Such conventional bicycles have several disadvantages, one of which is that the rider must remove one hand from the handlebar to operate the control lever and must continue to hold pressure on the lever until the shifting operation is completed. Furthermore, the operator must determine, judging from the difficulty or ease with which he is pedalling, when to change gears and which gear to change to. A slight inaccuracy in the movement of the control lever can result in a change to a gear not desired by the rider.

Another disadvantage of the conventional arrangement is that wear and tear on the flexible wire causes fraying and breakage. In addition, continual adjustment of the mechanism is usually necessary because of slight changes and slippage.

The main object of the present invention is to generally overcome the disadvantages of conventional multispeed bicycles by eliminating the manual control. The preferred form of the invention also eliminates the relatively complicated derailing mechanism.

Another object of the invention is to obviate the necessity of the rider judging when a gear change should be made and also obviating the necessity of the rider removing one of his hands from the handlebar thereby improving safety.

Other objects and advantages will be apparent from the following specification and from the drawings.

Figure 1:
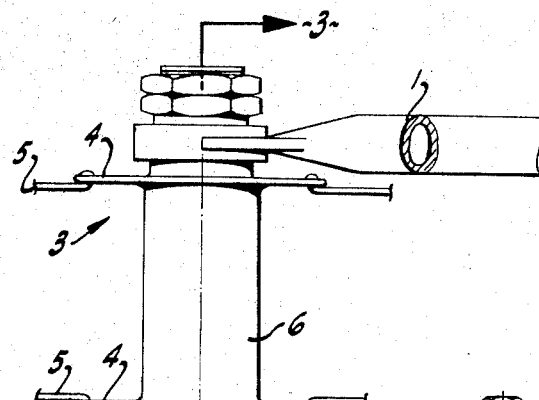
FIG. 1 is a horizontal cross sectional view taken through the frame of a bicycle showing a portion of the rear wheel and the associated mechanism including the invention.
Figure 1:
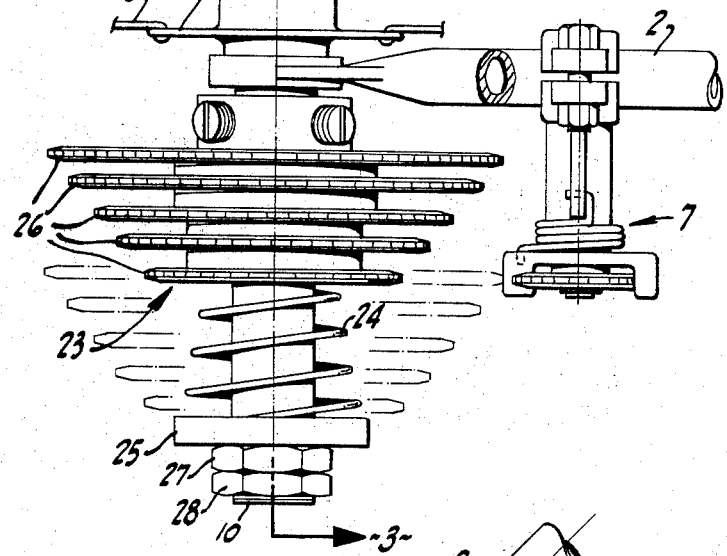
Figure 1:
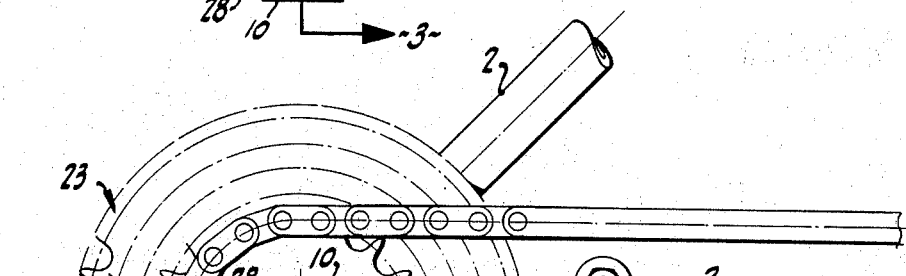
Figure 2:
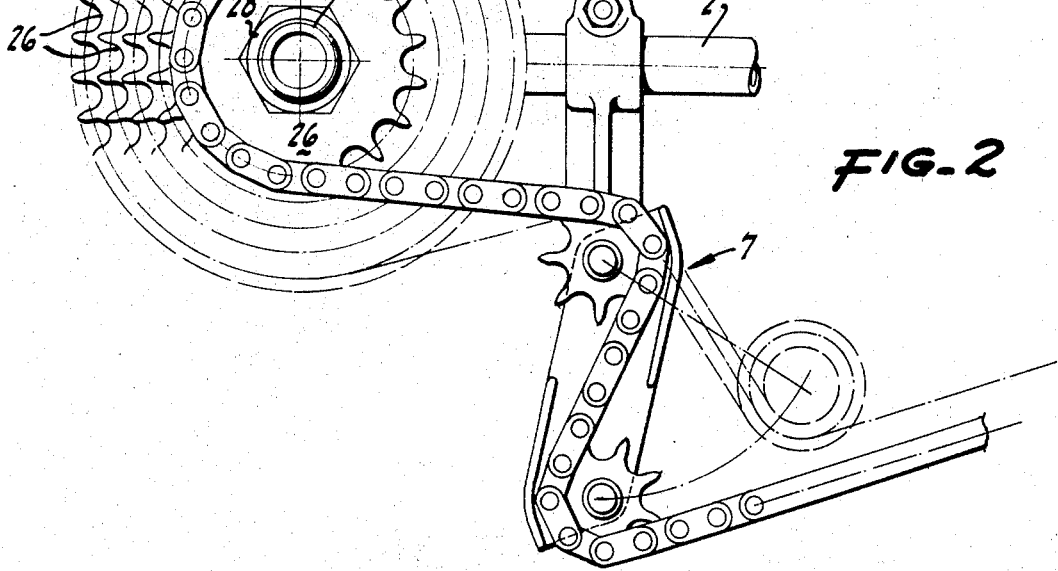
FIG. 2 is a side elevation of the structure of FIG. 1.

In detail, and first with reference to FIGS. 1 and 2, the invention is adapted to be employed adjacent the rear wheel of a bicycle which includes a pair of downwardly and rearwardly extending frame members 1, 2 which are adapted to transmit the weight of the rider to the rear wheel generally designated 3. Said wheel includes a pair of circular flanges 4 to which are secured the spokes 5 of the wheel and said flanges are interconnected by a cylindrical portion 6.

Figure 3:
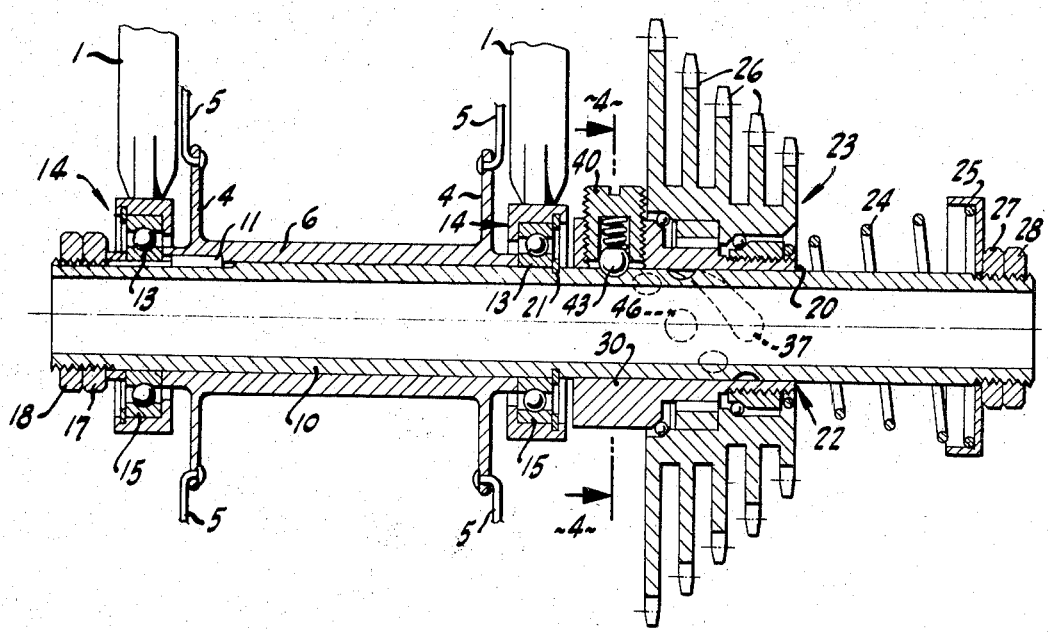
FIG. 3 is a vertical transverse section through the rear wheel of the bicycle and showing the invention in association therewith.

By the present invention, and as best seen in FIG. 3, the cylindrical portion 6 is fixedly secured to a hollow shaft 10 by means of a key 11 and this assembly is fixedly secured to the inner race of a pair of ball bearings generally designated 14. The frame members 1, 2 are fixedly secured to the outer races 15 of said ball bearings. The shaft 10 is externally threaded at one of its ends to receive a nut 17 and a lock nut 18 for holding the assembly together. As best seen in FIG. 3 the nut 17 bears against a cylindrical spacer sleeve 19 which in turn engages the inner race 13 of the adjacent ball bearing 14. The other ball bearing 14 is fixed axially of the shaft 10 by a split ring 21.

The shaft 10 extends considerably beyond the second bearing 14 and supported on said shaft is the sprocket hub generally designated 23. This hub includes the usual free wheeling unit and a plurality of sprockets 26 fixedly secured to said hub and similar to those in a conventional multispeed bicycle.

A compression spring 24 is interposed between the outer side of sprocket hub 23 and a spring retainer 25 which in turn is fixed relative to shaft 10 by means of a nut 27 and lock nut 28 which are threadedly secured to the outer end of shaft 10.

Figure 4:
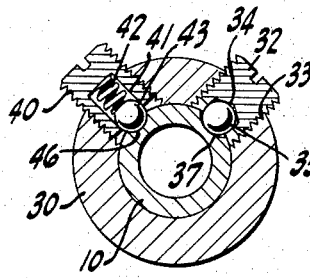
FIG. 4 is a transverse sectional view through the rear wheel shaft showing the positioning means and the torque responsive elements.

The inner end of spring 24 actually engages the inner race 20 of a free wheeling unit generally designated 22. The free wheeling unit 22 is conventional and the same is not described in detail herein. However, by the present invention the inner race 20 of said free wheeling unit is extended to the left as seen in FIG. 3 to provide a circular member 30 (FIG. 4). Received radially of said circular member 30 is a screw 32 threadedly received in a complementarily threaded hole 33 and provided at its inner end with a recess 34 in which is partially received a hardened ball 35. The outer periphery of hollow shaft 10 is formed with a helical groove 37 which constitutes a track in which the ball 35 is received. At this point it may be noted that as the driving torque on hub 23 increases, the ball 35 tends to move along the length of track 37 since the latter is disposed angularly relative to the periphery of hollow shaft 10. Such movement along the track 37 is opposed by the spring 24 so that the actual movement along the length of track 37 by ball 35 is generally proportional to the torque being exerted on the chain driven sprocket hub 23.

Figure 5:
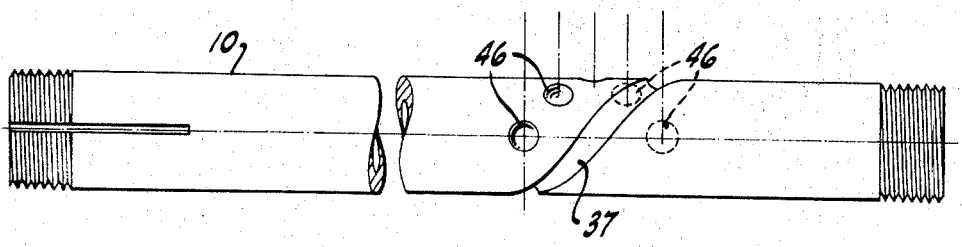
FIG. 5 is a side elevation of the supporting shaft showing the track and the positioning recesses.

Angularly offset from ball 35 in member 30 is another screw 40 which is provided at its inner end with an axially extending recess 41 in which is received a compression spring 42. This spring 42 serves to urge a hardened ball 43 radially inwardly against the hollow shaft 10. A plurality of recesses 46 are formed in the outer periphery of shaft 10 and said recesses are positioned along a line parallel to the track 37 as best seen in FIG. 5. It will thus be seen that as the hub 23 tends to move axially to the right as seen in FIG. 3 against the urgency of spring 24, the spring urged ball 43 will be yieldably forced into the recess 46 which is in alignment with the ball 35.

In operation under minimum load, the chain 7 (FIG. 2) is on the smallest diameter sprocket of hub 23 and the ball 35 is at the inner end of track 37 with the spring urged ball 43 in registration with the innermost of the recesses 46. As the torque on the hub 23 increases with an increase in chain tension brought about by greater pedal pressure by the rider, the ball 35 tends to follow along the length of track 37 in an outward direction or to the right as seen in FIG. 5, and if the increase in torque is sufficient the spring urged ball 43 is forced out of the innermost recess 46 and travels on the periphery of shaft 10 until the ball 43 registers with the next recess 46 at which point the ball enters the said next recess 46. If the torque is increased further, it will be apparent that the ball 35 will move further along the track 37 to the right and so on. If the chain 7 is on one of the larger diameter sprockets 26 and the torque is reduced, spring 24 urges the hub 23 to the left as seen in FIG. 3 causing the ball 35 to be urged also to the left along the length of track 37 in a reverse direction from that described above.

One of the features of the present invention is that the average pedal force holds about the same throughout the entire range of sprockets. This is so despite the fact that momentary increases and decreases in the pedal force are employed to shift the chain from one sprocket to another.

In the above described embodiment of the preferred form of the invention it will be noted that momentary increases and decreases in pedal pressure will not tend to make the device shift excessively because of the presence of the spring urged ball 43 and the complementarily formed recesses 46. However, in order to enhance the stability of the device and to further prevent undesired shifting in response to momentary changes in torque, a modification of the structure shown in FIG. 6 may be employed. In this case, the general construction is similar to that described above except that the ball 35 is replaced by a stud 50 which slides along a groove constituting a track 51 in the hollow shaft 10'. Secured to the inner end of stud 50 is an elongated shaft 53 which is slidably received through a cylindrical housing 54 which contains a liquid 55 therein thus forming a dashpot. Fixedly secured to the shaft 53 intermediate the ends of housing 54 is a piston 56 which is provided with a plurality of holes 57 therethrough so that any sudden change in the torque applied to hub 23 is absorbed in the dashpot. In this manner momentary increases and decreases in torque applied to hub 23 do not affect the position of the hub axially of the shaft 10'.

Figure 6:
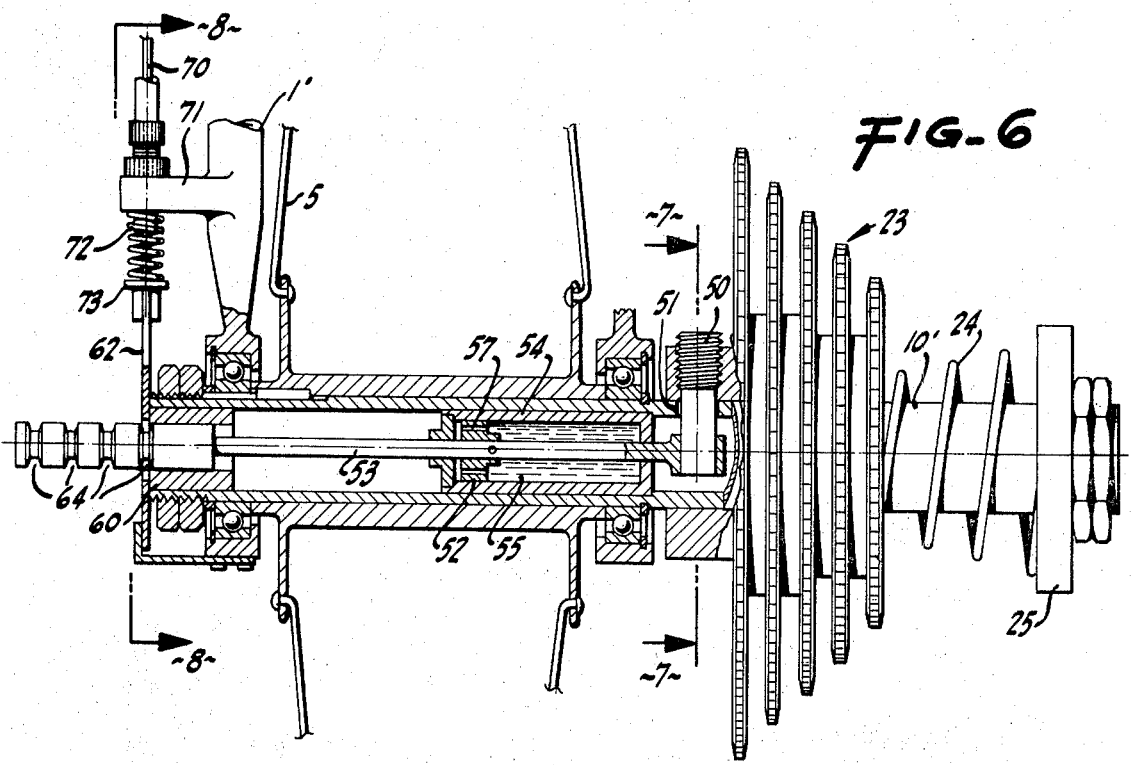
FIG. 6 is a view similar to FIG. 3 showing a modified form of the invention.
Figure 7:
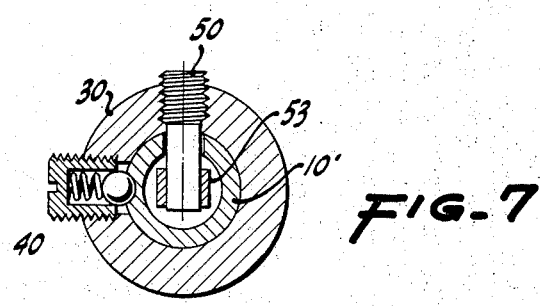
FIG. 7 is a transverse sectional view taken in a plane indicated by lines 7—7 in FIG. 6.
Figure 8:
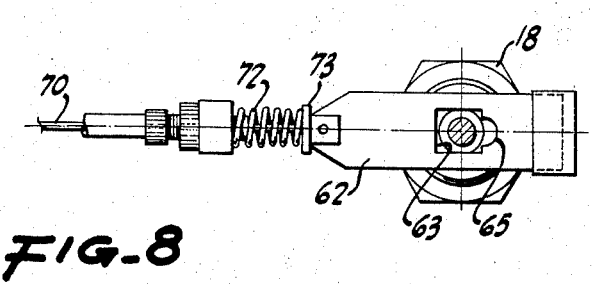
FIG. 8 is a side elevation of the locking means taken in a plane indicated by lines 8—8 in FIG. 6.

Another modification of the invention is incorporated in the structure shown in FIG. 6. This modification includes a means for locking the hub 23 in any desired position by the rider. To this end the shaft 53 extends out the left-hand end of shaft 10', and is slidably supported in a bearing 60 fixedly secured within shaft 10'. Shaft 53 is enlarged at its outer end and passes through a locking plate 62 which is provided with a generally rectangular aperture 63 for receiving the enlarged portion therethrough. Said enlarged portion is provided with a plurality of peripherally extending grooves 64 and the aperture 63 in locking plate 62 is provided with a semicircular enlarged portion 65 which, when the plate 62 is moved to the left as seen in FIG. 8, is received within one of the grooves 64 thereby preventing axial movement of shaft 63 and holding the sprocket assembly 23 in a fixed position.

In order to permit actuation of the locking plate 62 by the rider, a flexible cable 70 is connected to said locking plate and passes through a bearing 71 secured to the frame member 1'. A compression spring 72 is interposed between bearing 71 and the enlarged outer end 73 of locking plate 62. By this structure the locking plate 62 is urged by spring 72 at all times toward the inoperative position shown in FIG. 8; however, when it is desired to cut out the automatic feature, the plate 62 may be pulled upwardly by the rider through the use of cable 70, thereby holding the inner shaft 53 in a fixed position.

Figure 9:
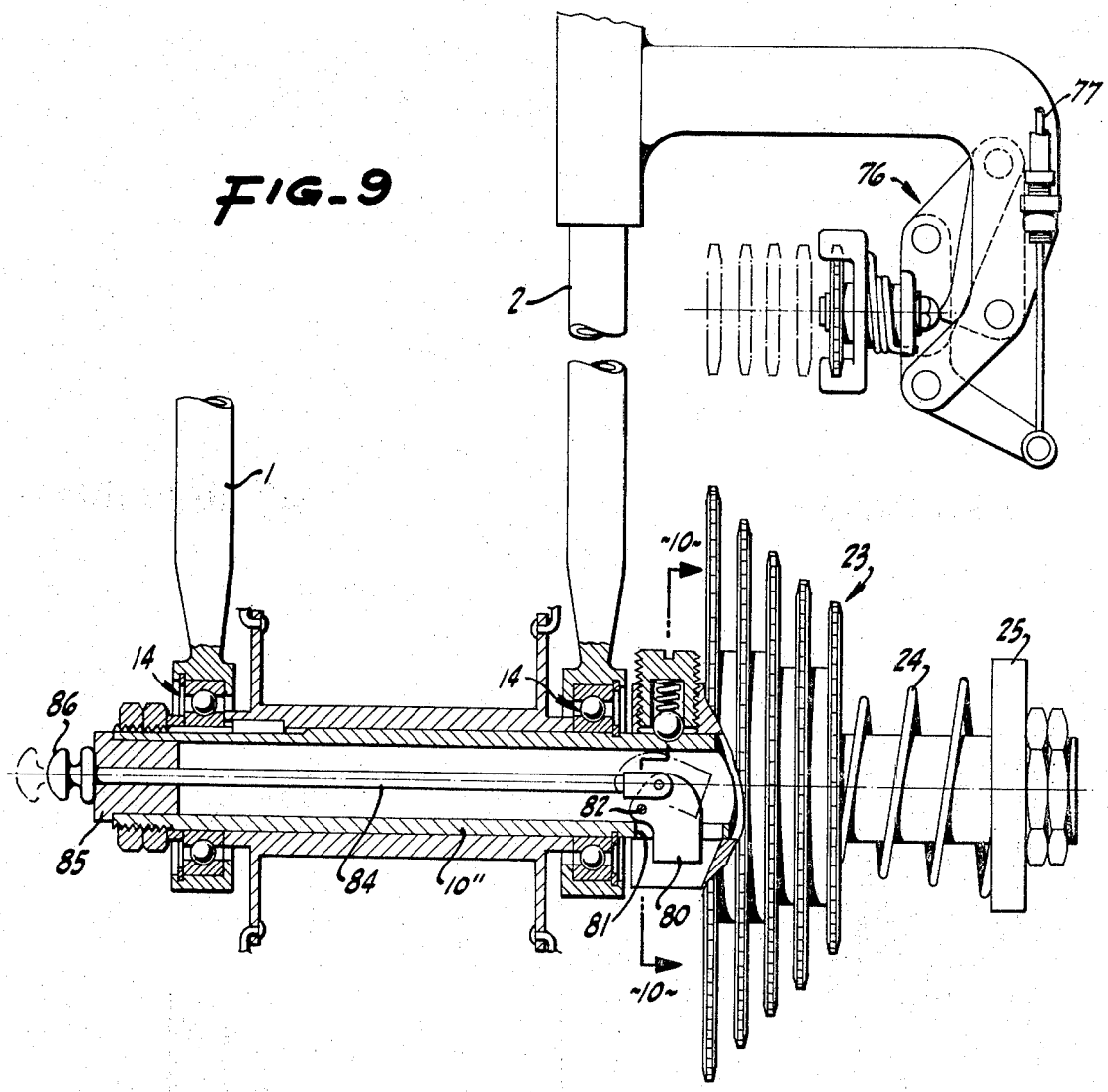
FIG. 9 is a view similar to FIG. 3 showing another modified form of the invention.
Figure 10:
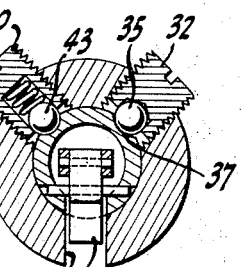
FIG. 10 is a transverse sectional view taken in a plane indicated by lines 10 in FIG. 9.

Still another modification of the invention is shown in FIGS. 9, 10. In this case, the sprocket hub 23 may be held in place and the conventional derailer mechanism generally designated 76 may be employed as in conventional bicycles. The actual details of the derailer 76 are not shown herein since the same is conventional and is operated by a flexible cable 77 in the normal manner.

In FIGS. 9, 10 a different form of locking mechanism is shown for holding the sprocket hub 23 against axial movement. This simplified locking mechanism comprises a detent 80 which is adapted to be swung from the inoperative dot-dash position shown in FIG. 9 to the operative full line position in which latter position the same extends through a slot 81 in the hollow shaft 10''. The detent 80 is swingably supported on a pin 82 which in turn is fixed to the hollow shaft 10'' and is actuated by means of an elongated bar 84 which extends through a bearing 85 at the outer end of shaft 10'' and is provided with an actuating knob 86 so that the device may be manually moved from the dot-dash position to the full line position and vice versa. This permits the rider to eliminate the automatic feature if desired and to rely on the conventional derailer 76.

It will be apparent that the amount of torque involved in shifting from one position of the sprocket hub to another may be adjusted not only by adjusting the compression of spring 24, but also by adjusting the compression of spring 42 which in part determines the torque at which the associated ball is urged out of its recess.

I claim:

1. In a multispeed bicycle that includes a wheel and a chain driven sprocket hub having a plurality of driving sprockets thereon,
  a shaft fixed to said wheel and coaxial therewith,
  means supporting said sprocket hub for movement peripherally and axially of said shaft,
  track means on said shaft extending peripherally and axially thereof,
  a member carried by said hub,
  a follower carried by said member and received in said track,
  spring means urging said hub axially of said shaft in one direction at all times,
  said follower being adapted to move with said member and said hub axially of said hub in the opposite direction against the urgency of said spring in response to an increase of driving torque on said hub,
  interengaging positioning means on said member and said shaft for releasably connecting said hub and shaft in a position corresponding to such torque.

2. A bicycle according to claim 1 wherein said positioning means comprises an element spring urged radially inwardly of said member and a plurality of recesses in said shaft adapted to receive said element therein.

3. A bicycle according to claim 1 wherein said track is a slot in said shaft extending along an arcuate path peripherally and axially of said shaft.

4. A bicycle according to claim 1 wherein said shaft is hollow and is provided with a dashpot, means connecting said hub with said dashpot for providing inertial resistance to axial movement of said hub.

5. A bicycle according to claim 1 wherein locking means is provided for preventing axial movement of said hub.

6. A bicycle according to claim 5 wherein a derailer is provided for shifting the chain from one sprocket to another.

7. A bicycle according to claim 5 wherein said locking means is operative to prevent axial movement of said hub in one of a plurality of positions of the latter.

* * * * *